US012789117B2

(12) United States Patent
Huang et al.

(10) Patent No.: US 12,789,117 B2
(45) Date of Patent: Nov. 10, 2026

(54) VENTING TANK, COOLING SYSTEM AND MOTOR VEHICLE INCLUDING VENTING TANK

(71) Applicant: Illinois Tool Works Inc., Glenview, IL (US)

(72) Inventors: Hui Huang, Shanghai (CN); Zhiming Han, Shanghai (CN)

(73) Assignee: Illinois Tool Works Inc., Glenview, IL (US)

(*) Notice: Subject to any disclaimer, the term of this patent is extended or adjusted under 35 U.S.C. 154(b) by 273 days.

(21) Appl. No.: 18/787,625

(22) Filed: Jul. 29, 2024

(65) Prior Publication Data

US 2025/0058251 A1 Feb. 20, 2025

(30) Foreign Application Priority Data

Aug. 15, 2023 (CN) ........................ 202311027673.1

(51) Int. Cl.
*B01D 19/00* (2006.01)
*F01P 11/02* (2006.01)

(52) U.S. Cl.
CPC ........ *B01D 19/0042* (2013.01); *F01P 11/028* (2013.01); *F28F 2265/18* (2013.01)

(58) Field of Classification Search
CPC ........................ B01D 19/0042; F28F 2265/18
See application file for complete search history.

(56) References Cited

U.S. PATENT DOCUMENTS

2018/0266306 A1* 9/2018 Dumas .................. F01P 11/029

FOREIGN PATENT DOCUMENTS

EP 3909798 A1 * 11/2021 ............ F01P 11/029
WO 2017053030 3/2017

* cited by examiner

*Primary Examiner* — Robert Clemente
(74) *Attorney, Agent, or Firm* — McAndrews, Held & Malloy, Ltd.

(57) ABSTRACT

The present disclosure provides a venting tank, a cooling system having the venting tank, and a motor vehicle having the cooling system. The venting tank comprises a tank body, a connecting pipe, a connecting pipe separator, and a bypass structure. The tank body has a degassing space therein. The connecting pipe is connected to the tank body and located outside the tank body. The connecting pipe separator is provided in the connecting pipe and extends along a length direction of the connecting pipe to separate an inlet channel and an outlet channel in the connecting pipe, wherein the inlet channel and the outlet channel are fluidly connected with the degassing space. The bypass structure forms a bypass flow path connecting the inlet channel with the outlet channel, wherein the bypass flow path is isolated from the degassing space. Part of a heat transfer fluid flowing in from the inlet channel is guided into the degassing space to be degassed, and the rest of the heat transfer fluid flowing in from the inlet channel does not pass through the degassing space but flows directly to the outlet channel via the bypass flow path.

12 Claims, 5 Drawing Sheets

VENTING TANK, COOLING SYSTEM AND MOTOR VEHICLE INCLUDING VENTING TANK

RELATED APPLICATION

The present application claims the benefit of Chinese Patent Application No. 202311027673.1, filed Aug. 15, 2023, titled "Venting Tank, Cooling System and Motor Vehicle Including Venting Tank," the contents of which are hereby incorporated by reference.

TECHNICAL FIELD

The present disclosure generally relates to a venting tank, a cooling system comprising the venting tank, and a motor vehicle comprising the cooling system.

BACKGROUND

A motor vehicle usually has a cooling system for cooling down a heat generating component in the motor vehicle. The cooling system comprises a heat transfer fluid circuit and a venting tank (also called an expansion tank or expansion pot). The venting tank is connected, via its inlet pipe and outlet pipe, in the heat transfer fluid circuit to degas a heat transfer fluid.

SUMMARY

The present disclosure relates generally to a venting tank. More specifically, a venting tank for a cooling system of a motor vehicle, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures, where like or similar reference numbers refer to like or similar structures. The figures are not necessarily to scale, emphasis instead being placed upon illustrating the principles of the devices, systems, and methods described herein.

DETAILED DESCRIPTION

Figure 1:
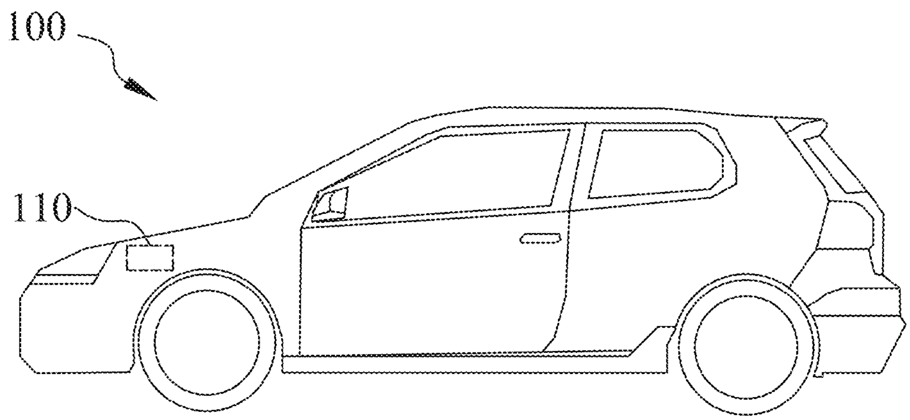
FIG. 1 is a schematic view of a motor vehicle according to an aspect of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein is not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent to or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

According to a first aspect of the present disclosure, the present disclosure provides a venting tank for a cooling system of a motor vehicle, the venting tank comprising a tank body, a connecting pipe, a connecting pipe separator, and a bypass structure. The tank body has a degassing space therein. The connecting pipe is connected to the tank body and located outside the tank body. The connecting pipe separator is provided in the connecting pipe and extends along a length direction of the connecting pipe to separate an inlet channel and an outlet channel in the connecting pipe, wherein the inlet channel and the outlet channel are fluidly connected with the degassing space. The bypass structure forms a bypass flow path connecting the inlet channel with the outlet channel, wherein the bypass flow path is isolated from the degassing space. Part of a heat transfer fluid flowing in from the inlet channel is guided into the degassing space to be degassed, and the rest of the heat transfer fluid flowing in from the inlet channel does not pass through the degassing space but flows directly to the outlet channel via the bypass flow path.

According to the venting tank in the first aspect described above, the bypass structure comprises a bypass chamber, a first opening and a second opening, wherein the first opening and the second opening are provided in a pipe wall of the connecting pipe, the inlet channel is fluidly connected with the bypass chamber via the first opening, and the outlet channel is fluidly connected with the bypass chamber via the second opening.

According to the venting tank in the first aspect described above, the bypass structure comprises a housing connected to a side wall of the tank body, and the bypass chamber is defined by the housing together with the side wall of the tank body.

According to the venting tank in the first aspect described above, the bypass structure is provided outside the tank body.

According to the venting tank in the first aspect described above, the venting tank further comprises a flow deflector plate provided in the degassing space and configured such that the heat transfer fluid flowing into the degassing space flows along a path around the flow deflector plate to the outlet channel.

According to the venting tank in the first aspect described above, a bottom of the flow deflector plate is connected to a bottom wall of the tank body, and a top of the flow deflector plate is not lower than the maximum liquid level in the tank body.

According to the venting tank in the first aspect described above, the venting tank further comprises a guide pipe and a guide pipe separator, wherein the guide pipe separator extends along a length direction of the guide pipe and separates an inflow guide channel and a return flow guide channel in the guide pipe, wherein the inflow guide channel fluidly connects the degassing space with the inlet channel, and the return flow guide channel fluidly connects the degassing space with the outlet channel. The flow deflector plate extends along the length direction of the guide pipe and is connected to the guide pipe separator.

According to the venting tank in the first aspect described above, there are gaps between two ends in a length direction of the flow deflector plate and the side wall of the tank body.

According to the venting tank in the first aspect described above, the venting tank further comprises a flow limiting structure provided in the inflow guide channel and configured to limit a flow rate of the heat transfer fluid flowing from the inflow guide channel into the degassing space.

According to the venting tank in the first aspect described above, the connecting pipe, the connecting pipe separator, the bypass structure, the flow deflector plate, the guide pipe and the guide pipe separator are formed in one piece.

According to a second aspect of the present disclosure, the present disclosure provides a cooling system comprising a venting tank according to the first aspect described above.

According to a third aspect of the present disclosure, the present disclosure provides a motor vehicle comprising a cooling system according to the second aspect described above.

FIG. 1 shows a schematic view of a motor vehicle 100 according to an aspect of the present disclosure. The motor vehicle 100 comprises a cooling system 110 for cooling a heat generating component of the motor vehicle 100.

Figure 2:
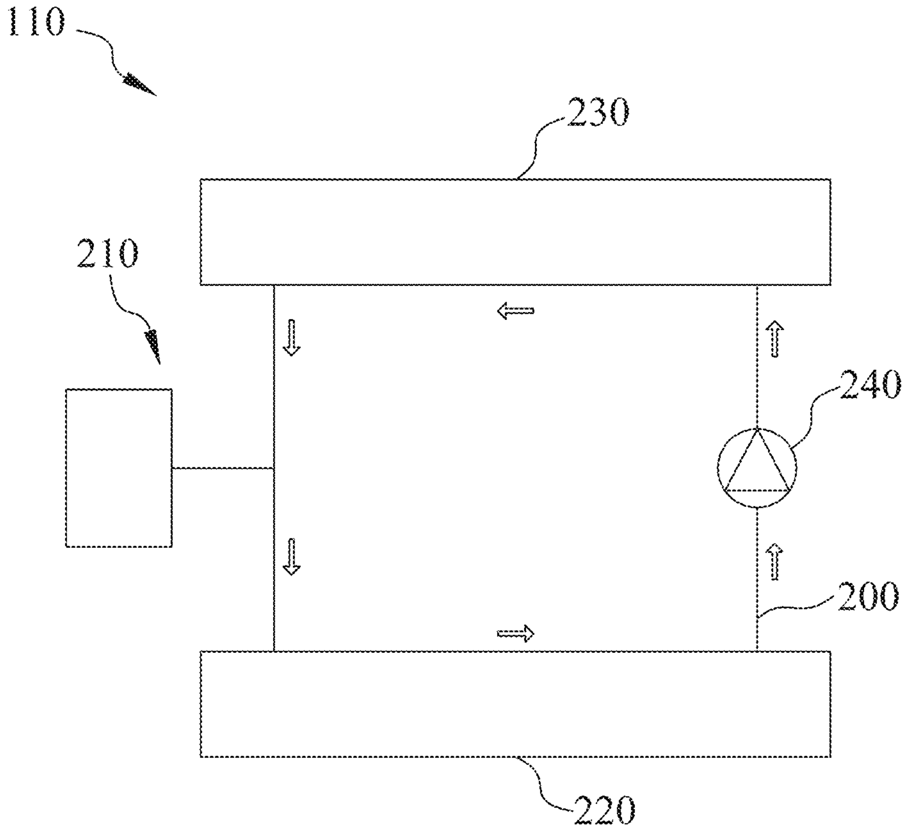
FIG. 2 is a block diagram of a cooling system of the motor vehicle in FIG. 1.

FIG. 2 shows a simplified block diagram of the cooling system 110. As shown in FIG. 2, the cooling system 110 comprises a heat transfer fluid circuit 200, and a venting tank 210, a component 220 to be cooled, a heat exchange device 230 and a pump 240 which are connected in the heat transfer fluid circuit 200. The component 220 to be cooled is, for example, a battery, an electric motor, or other components of the motor vehicle 100.

A heat transfer fluid (e.g., coolant liquid) in the heat transfer fluid circuit 200 circulates and flows between the heat exchange device 230 and the component 220. The heat transfer fluid absorbs heat emitted by the component 220 when flowing through a cooling passage (not shown) of the component 220, and releases the heat when flowing through the heat exchange device 230, so as to cool the component 220 by the circulation and flowing of the heat transfer fluid. The pump 240 is configured to provide power for the circulation and flowing of the heat transfer fluid.

During operation of the cooling system 110, gas is generated in the heat transfer fluid due to heat and other reasons, and excessive gas may affect the normal operation of the cooling system 110. The venting tank 210 is connected in the heat transfer fluid circuit 200 for degassing the heat transfer fluid.

Figure 3A:
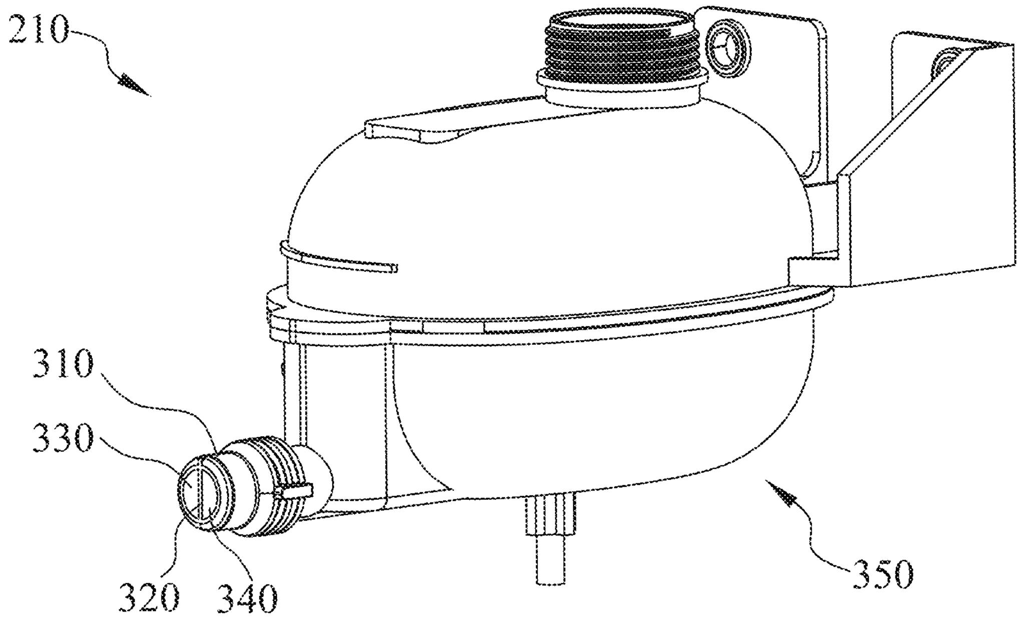
FIG. 3A is a perspective view of a venting tank according to an aspect of the present disclosure.
Figure 3B:
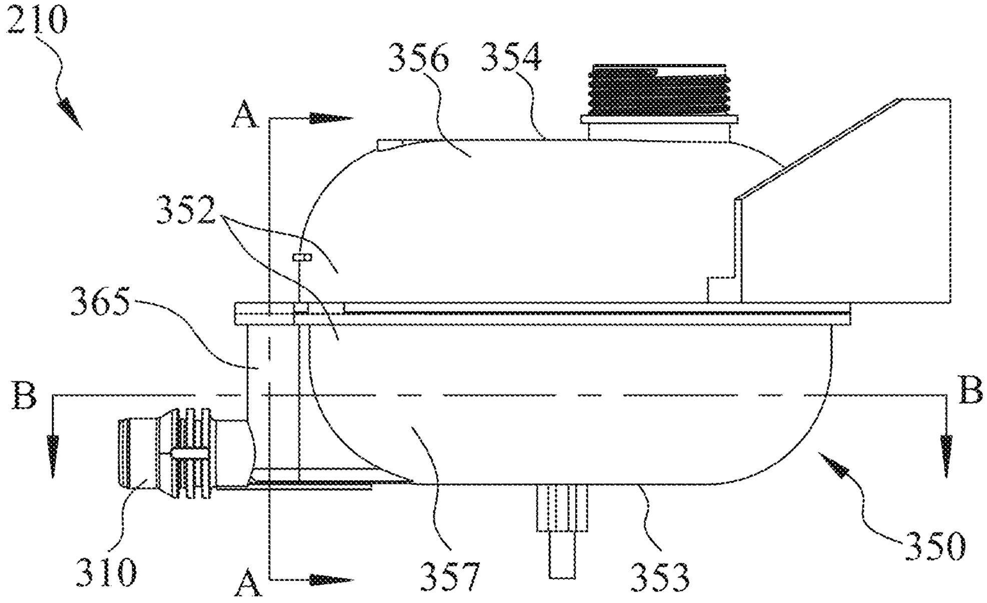
FIG. 3B is a front view of the venting tank in FIG. 3A.
Figure 3C:
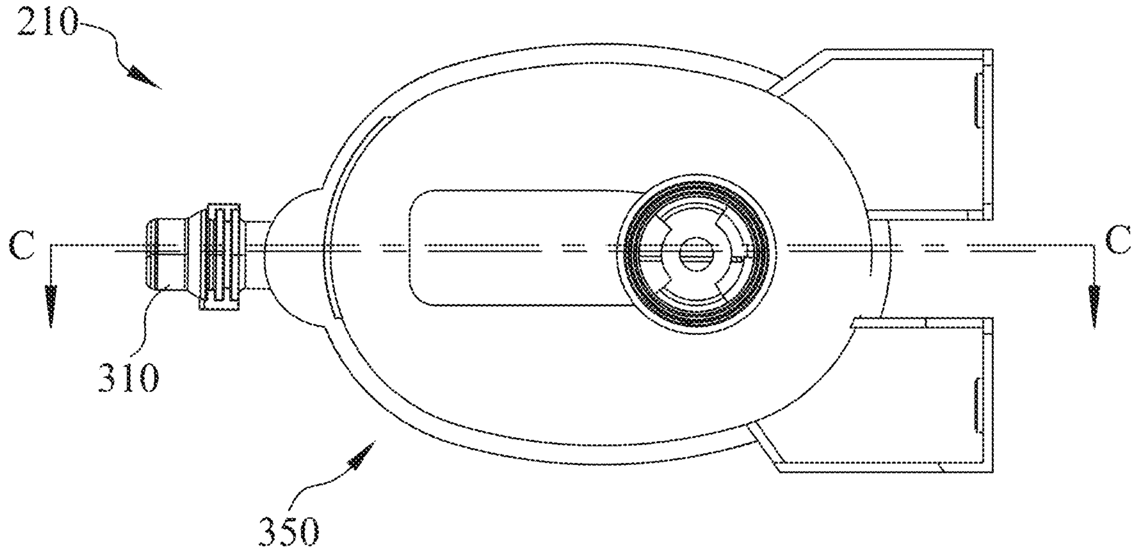
FIG. 3C is a top view of the venting tank in FIG. 3A.
Figure 3D:
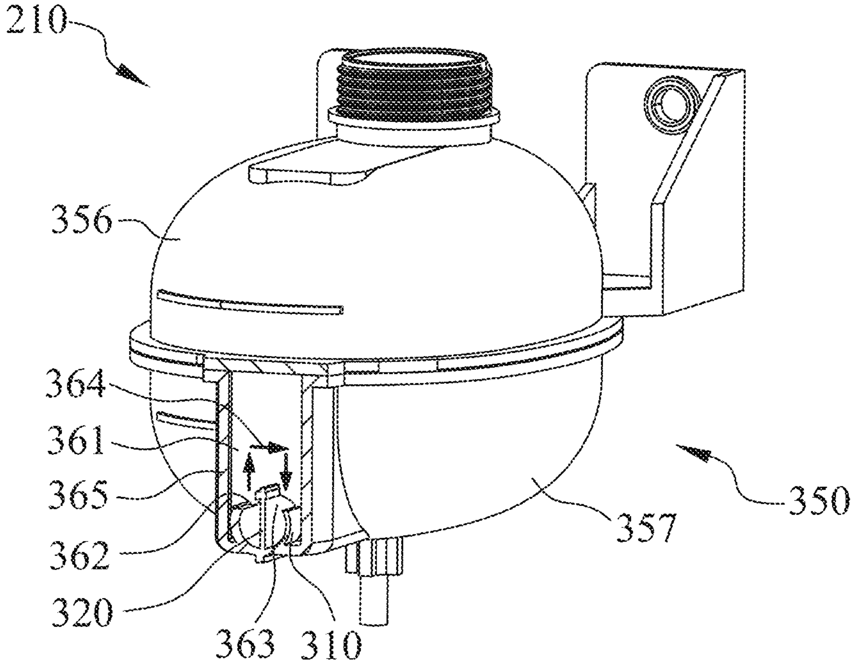
FIG. 3D is a cross-sectional perspective view along line A-A in FIG. 3B.
Figure 3E:
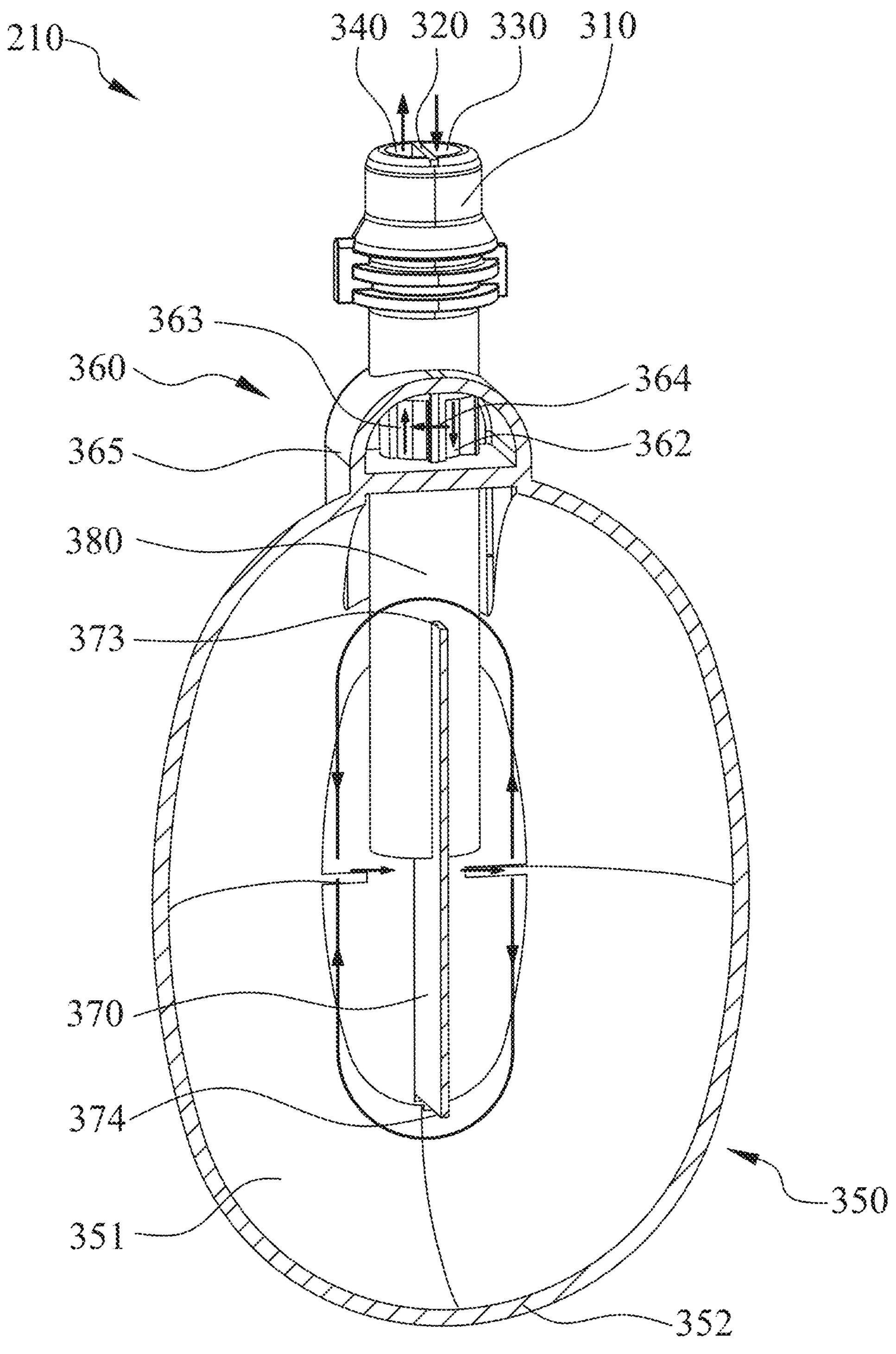
FIG. 3E is a cross-sectional perspective view along line B-B in FIG. 3B from a first perspective.
Figure 3F:
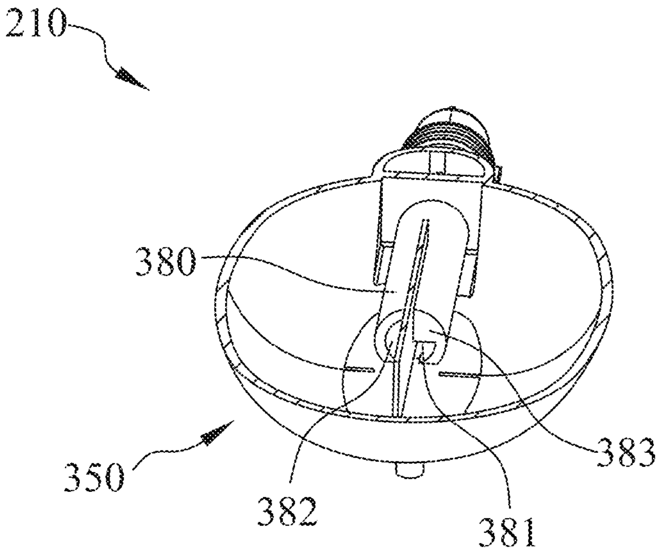
FIG. 3F is a cross-sectional perspective view along line B-B in FIG. 3B from a second perspective.
Figure 3G:
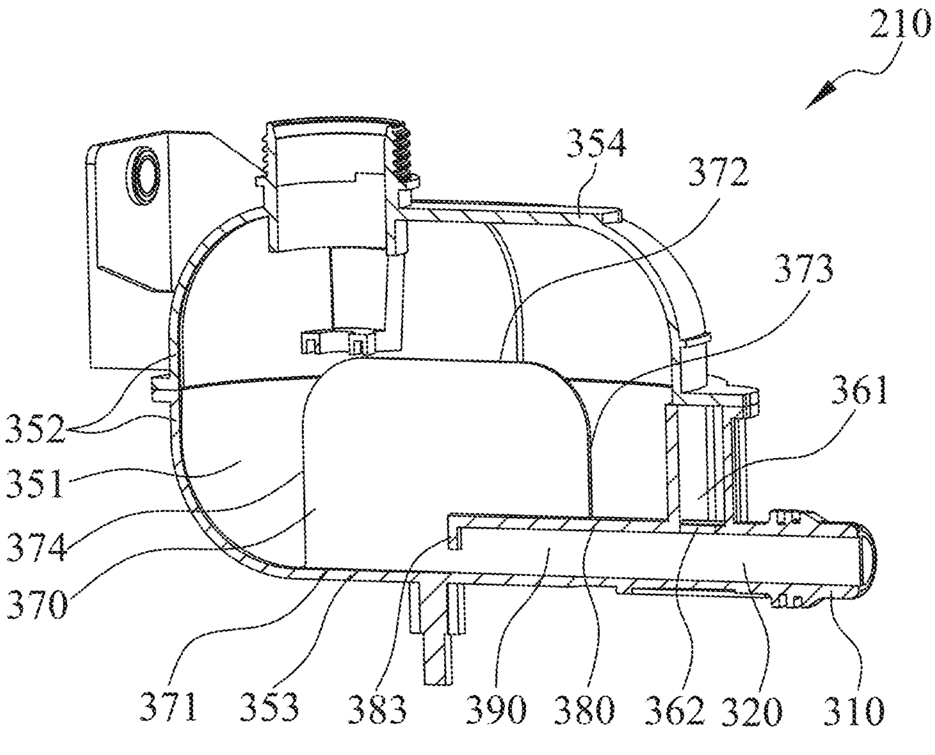
FIG. 3G is a cross-sectional view along line C-C in FIG. 3C.

FIGS. 3A-3G show the specific structure of the venting tank 210 according to an aspect of the present disclosure. FIG. 3A is a perspective view of the venting tank 210, FIG. 3B is a front view of the venting tank 210, FIG. 3C is a top view of the venting tank 210, FIG. 3D is a cross-sectional perspective view along line A-A in FIG. 3B, FIGS. 3E and 3F are cross-sectional perspective views along line B-B in FIG. 3B, and FIG. 3G is a cross-sectional view along line C-C in FIG. 3C.

Referring to FIGS. 3A-3G, the venting tank 210 comprises a tank body 350, a connecting pipe 310, a connecting pipe separator 320, a bypass structure 360, a flow deflector plate 370, a guide pipe 380, and a guide pipe separator 390.

The connecting pipe 310 is connected to the tank body 350 and located outside the tank body 350. The connecting pipe separator 320, which is substantially plate-shaped, is provided in the connecting pipe 310 and extends along a length direction of the connecting pipe 310. A width direction of the connecting pipe separator 320 (i.e., the vertical direction according to the orientation shown in FIG. 3G) is along a radial direction of the connecting pipe 310, and opposite sides in the width direction of the connecting pipe separator 320 are each connected to a pipe wall of the connecting pipe 310, so as to separate an inlet channel 330 and an outlet channel 340 in the connecting pipe 310. The heat transfer fluid in the heat transfer fluid circuit 200 flows from the inlet channel 330 into the venting tank 210, and is discharged out of the venting tank 210 through the outlet channel 340.

During operation, the venting tank 210 is designed to be arranged according to the orientation shown in FIGS. 3A, 3B, 3D and 3G, so that the direction of gravity is substantially along the vertical direction in FIGS. 3A, 3B, 3D and 3G. The tank body 350 has a degassing space 351 therein. The degassing space 351 contains the degassed heat transfer fluid and a gas above the liquid surface of the heat transfer fluid. The tank body 350 comprises a top wall 354, a bottom wall 353, and a side wall 352. The top wall 354 is opposite the bottom wall 353, and the side wall 352 is connected to the top wall 354 and the bottom wall 353. According to the orientation shown in FIG. 3G, the top wall 354 is located above the degassing space 351, that is, at the side close to the gas, and the bottom wall 353 is located below the degassing space 351, that is, at the side close to the heat transfer fluid. The inlet channel 330 and the outlet channel 340 are fluidly connected with the degassing space 351 to guide the heat transfer fluid to flow into and out of the degassing space 351, respectively.

The guide pipe 380 is disposed inside the tank body 350, and the guide pipe separator 390 is substantially plate-shaped and extends along a length direction of the guide pipe 380. A width direction of the guide pipe separator 390 (i.e., the vertical direction according to the orientation shown in FIG. 3G) is along a radial direction of the guide pipe 380, and opposite sides in the width direction of the guide pipe separator 390 are respectively connected to a pipe wall of the guide pipe 380, so as to separate an inflow guide channel 381 and a return flow guide channel 382 in the guide pipe 380. The inflow guide channel 381 and the return flow guide channel 382 are fluidly connected with the degassing space 351.

The guide pipe 380 has the same inner diameter as the connecting pipe 310 and is coaxially connected to the connecting pipe 310. The guide pipe separator 390 extends along the length direction of the connecting pipe separator 320, and one end in the length direction of the guide pipe separator 390 is connected to one end in the length direction of the connecting pipe separator 320, such that the inflow guide channel 381 is fluidly connected to the inlet channel 330, and the return flow guide channel 382 is fluidly connected to the outlet channel 340, so as to fluidly connect the degassing space 351 to the inlet channel 330 via the inflow guide channel 381, and to fluidly connect the degassing space 351 to the outlet channel 340 via the return flow guide channel 382.

A lower part of the guide pipe 380 (according to the orientation shown in FIG. 3G) is connected to the bottom wall 353 of the tank body 350, that is, the bottom wall 353 of the tank body 350 forms part of the pipe wall of the guide pipe 380, so as to facilitate the gas in the heat transfer fluid to be discharged upward by means of gravity, and to facilitate the degassed heat transfer fluid to be fully discharged out of the degassing space 351.

It should be noted that although in the illustrated aspect, the guide pipe 380 has the same inner diameter as the connecting pipe 310 and is coaxially connected to the connecting pipe 310 for case of design and manufacturing, in some other aspects, the inner diameters and/or orientations of the guide pipe 380 and the connecting pipe 310 may be different.

Continuing to refer to FIGS. 3A-3G, the flow deflector plate 370 is provided in the degassing space 351, the bottom 371 of the flow deflector plate 370 is connected to the bottom wall 353 of the tank body 350, the top 372 of the flow deflector plate 370 is not lower than the maximum liquid level in the tank body 350 (i.e., the designed nominal liquid level). The flow deflector plate 370 extends along the length direction of the guide pipe 380 and is connected to the guide pipe separator 390, so as to force the heat transfer fluid flowing from the inflow guide channel 381 into the degassing space 351 to flow to the return flow guide channel 382 along a relatively long curved path bypassing the flow deflector plate 370, so as to improve the degassing effect on the heat transfer fluid.

It should be noted that, although in the illustrated aspect, there are gaps between the opposite ends 373, 374 in the length direction of the flow deflector plate 370 and the side wall 352 of the tank body 350, so that the heat transfer fluid flowing from the inflow guide channel 381 into the degassing space 351 bypasses the two ends 373, 374 of the flow deflector plate 370 along two substantially U-shaped paths indicated by the arrows in FIG. 3E, and then flows into the return flow guide channel 382, in some other aspects, it is possible that there is a gap between only one of the two ends 373, 374 of the flow deflector plate 370 and the side wall 352 of the tank body 350. In addition, although in the illustrated aspect, the flow deflector plate 370 is configured as a flat plate extending along the length direction of the guide pipe 380 for case of manufacturing, in some other aspects, the flow deflector plate 370 may be configured to extend along another direction and/or be configured in another shape.

As can be seen from the above, in order to fully degas the heat transfer fluid in the degassing space 351, the flow path for guiding the degassing of the heat transfer fluid is designed to be relatively long. If all of the heat transfer fluid flowing into the venting tank 210 from the inlet channel 330 passes through the degassing space 351 via the flow path to be degassed, a relatively large pressure drop may be generated in the heat transfer fluid circuit. In order to ensure that the circulation pressure of the heat transfer fluid circuit meets requirements, the venting tank 210 forms a bypass flow path 364 connecting the inlet channel 330 with the outlet channel 340 by providing the bypass structure 360, and the bypass flow path 364 is isolated from the degassing space 351 such that part of the heat transfer fluid flowing in from the inlet channel 330 is guided into the degassing space 351, and flows into the outlet channel 340 after being degassed in the degassing space 351, while the rest of the heat transfer fluid flowing in from the inlet channel 330 does not pass through the degassing space 351 but flows directly to the outlet channel 340 via the bypass flow path 364.

Specifically, the bypass structure 360 comprises a housing 365, and a bypass chamber 361, a first opening 362 and a second opening 363 which are located in the housing 365. The bypass structure 360 is provided outside the tank body 350 and connected to the side wall 352 of the tank body 350, that is, the bypass structure 360 is disposed at the end of the connecting pipe 310 that is connected to the tank body 350, and the bypass chamber 361 is defined by the housing 365 together with the side wall 352 of the tank body 350.

The first opening 362 and the second opening 363 are located within the housing 365 and disposed in the pipe wall of the connecting pipe 310, for example, by cutting off a portion of the pipe wall of the connecting pipe 310 that is on the side of the inlet channel 330 to form the first opening 362 passing through the pipe wall, and by cutting off a portion of the pipe wall of the connecting pipe 310 that is on the side of the outlet channel 340 to form the second opening 363 passing through the pipe wall, so that the inlet channel 330 is fluidly connected with the bypass chamber 361 via the first opening 362, and the outlet channel 340 is fluidly connected with the bypass chamber 361 via the second opening 363.

In this way, the bypass chamber 361, the first opening 362 and the second opening 363 form the bypass flow path 364 that connects the inlet channel 330 with the outlet channel 340, and the bypass flow path 364 is isolated from the degassing space 351, so that part of the heat transfer fluid flowing in from the inlet channel 330 flows from the first opening 362 to the second opening 363 through the bypass chamber 361, and then flows out along the outlet channel 340, that is, this part of the heat transfer fluid does not pass through the degassing space 351 and is not degassed.

It should be noted that, although in the illustrated aspect, the bypass structure 360 is provided outside the tank body 350 and connected to the side wall 352 of the tank body 350, in other aspects, the bypass structure 360 may be provided at the middle of the connecting pipe 310, or provided inside the tank body 350, as long as the bypass structure 360 forms the bypass flow path 364 that connects the inlet channel 330 with the outlet channel 340 and the bypass flow path 364 is isolated from the degassing space 351.

Continuing to refer to FIGS. 3A-3G, a flow limiting structure 383 is provided in the inflow guide channel 381 to limit a flow rate of the heat transfer fluid flowing into the degassing space 351, so as to ensure that sufficient heat transfer fluid bypasses the degassing space 351 along the bypass flow path 364, thereby ensuring that the circulation pressure of the heat transfer fluid circuit meets the requirements.

Specifically, the flow limiting structure 383 is a stop block, and is disposed at the end of the inflow guide channel 381 that is away from the connecting pipe 310. The flow limiting structure 383 blocks part of the cross-section of the inflow guide channel 381. In this way, by designing the size of the flow limiting structure 383, the flow rate of the heat transfer fluid flowing into the degassing space 351 can be conveniently and accurately controlled, and the structure is simple, and is easy to design and manufacture. Optionally, the flow limiting structure 383 is configured such that 10% to 40% of the total flow of the heat transfer fluid flowing in from the inlet channel 330 enters the degassing space 351 to be degassed, and the remaining flow bypasses the degassing space 351 via the bypass flow path 364.

The tank body 350 is of a split structure, comprising an upper tank body 356 and a lower tank body 357. The upper tank body 356 and the lower tank body 357 respectively define an upper half and a lower half of the degassing space 351 (according to the orientation shown in FIG. 3G). The connecting pipe 310, the connecting pipe separator 320, the flow deflector plate 370, the guide pipe 380, the flow limiting structure 383, the guide pipe separator 390 and the housing 365 of the bypass structure 360 are formed integrally with the lower tank body 357, for example, by molding or injection molding, so as to facilitate manufacturing and assembly, and to ensure the sealing of the connecting portions to prevent fluid leakage.

According to the venting tank of the aspects of the present disclosure, by separating the inlet channel and the outlet channel in the connecting pipe, only one connecting pipe is needed to connect the venting tank in the heat transfer fluid circuit. Compared with a conventional solution of connecting the venting tank in the heat transfer fluid circuit by means of two pipelines, namely, an inlet pipeline and an outlet pipeline, the present disclosure can save space, reduce the number of parts (such as pipelines, pipe joints, pipe clamps, etc.), facilitate manufacturing and installation, and can reduce costs. In addition, the bypass structure according to the aspects of the present disclosure utilizes the tank body of the venting tank to participate in the formation of the bypass chamber, which not only simplifies the structure and saves space, but also makes the entire venting tank more integrated, because the housing of the bypass structure can be integrated with the tank body of the venting tank, and looks like just a small outward protrusion of the tank body. This not only enables the venting tank of the present disclosure to meet the requirement of simple shaping as a whole, but also makes it easier to manufacture (e.g., through integrally molding).

Although the present disclosure is described in conjunction with the examples of aspects outlined above, various alternatives, modifications, variations, improvements and/or substantial equivalents, which are known or anticipated at present or to be anticipated before long, may be obvious to those of at least ordinary skill in the art. In addition, the technical effects and/or technical problems described in this specification are exemplary rather than limiting. Therefore, the disclosure in this specification may be used to solve other technical problems and have other technical effects and/or may solve other technical problems. Accordingly, the examples of the aspects of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents.

What is claimed is:

1. A venting tank for a cooling system of a motor vehicle, the venting tank comprising:

a tank body having a degassing space therein;

a connecting pipe connected to the tank body and located outside the tank body;

a connecting pipe separator provided in the connecting pipe and extending along a length direction of the connecting pipe to separate an inlet channel and an outlet channel in the connecting pipe, wherein the inlet channel and the outlet channel are fluidly connected with the degassing space; and a bypass structure forming a bypass flow path connecting the inlet channel with the outlet channel, wherein the bypass flow path is isolated from the degassing space;

wherein part of a heat transfer fluid flowing in from the inlet channel is guided into the degassing space to be degassed, and the rest of the heat transfer fluid flowing in from the inlet channel does not pass through the degassing space but flows directly to the outlet channel via the bypass flow path.

2. The venting tank of claim 1, wherein the bypass structure comprises a bypass chamber, a first opening and a second opening, wherein the first opening and the second opening are provided in a pipe wall of the connecting pipe, the inlet channel is fluidly connected with the bypass chamber via the first opening, and the outlet channel is fluidly connected with the bypass chamber via the second opening.

3. The venting tank of claim 2, wherein the bypass structure comprises a housing connected to a side wall of the tank body, and the bypass chamber is defined by the housing together with the side wall of the tank body.

4. The venting tank of claim 1, wherein the bypass structure is provided outside the tank body.

5. The venting tank of claim 1, wherein the venting tank further comprises a flow deflector plate provided in the degassing space and configured such that the heat transfer fluid flowing into the degassing space flows along a path around the flow deflector plate to the outlet channel.

6. The venting tank of claim 5, wherein a bottom of the flow deflector plate is connected to a bottom wall of the tank body, and a top of the flow deflector plate is not lower than the maximum liquid level in the tank body.

7. The venting tank of claim 5, wherein the venting tank further comprises a guide pipe and a guide pipe separator, the guide pipe separator extending along a length direction of the guide pipe and separating an inflow guide channel and a return flow guide channel in the guide pipe, wherein the inflow guide channel fluidly connects the degassing space with the inlet channel, and the return flow guide channel fluidly connects the degassing space with the outlet channel; and wherein the flow deflector plate extends along the length direction of the guide pipe and is connected to the guide pipe separator.

8. The venting tank of claim 7, wherein there are gaps between two ends in a length direction of the flow deflector plate and the side wall of the tank body.

9. The venting tank of claim 7, wherein the venting tank further comprises a flow limiting structure provided in the inflow guide channel and configured to limit a flow rate of the heat transfer fluid flowing from the inflow guide channel into the degassing space.

10. The venting tank of claim 7, wherein the connecting pipe, the connecting pipe separator, the bypass structure, the flow deflector plate, the guide pipe and the guide pipe separator are formed in one piece.

11. A cooling system, comprising a venting tank of claim 1.

12. A motor vehicle, comprising a cooling system of claim 11.

* * * * *